(12) United States Patent
Feng et al.

(10) Patent No.: US 11,108,333 B2
(45) Date of Patent: Aug. 31, 2021

(54) DC-DC CONVERTERS

(71) Applicant: Hamilton Sundstrand Corporation, Charlotte, NC (US)

(72) Inventors: Frank Z. Feng, Loves Park, IL (US); Christopher J. Courtney, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/675,377

(22) Filed: Nov. 6, 2019

(65) Prior Publication Data

US 2021/0135571 A1 May 6, 2021

(51) Int. Cl.
*H02M 3/335* (2006.01)
*H02M 3/158* (2006.01)
*H02M 1/15* (2006.01)

(52) U.S. Cl.
CPC ......... *H02M 3/33584* (2013.01); *H02M 1/15* (2013.01); *H02M 3/158* (2013.01); *H02M 3/33569* (2013.01); *H02M 3/33576* (2013.01)

(58) Field of Classification Search
CPC ......... H02M 3/33569; H02M 3/33576; H02M 3/33584
USPC .................................. 363/18, 20, 21.02, 132
See application file for complete search history.

(56) References Cited

U.S. PATENT DOCUMENTS

| 4,833,584 | A  | * | 5/1989  | Divan ................... H02M 7/538 363/132 |
| 7,595,597 | B2 |   | 9/2009  | King et al. |
| 8,421,271 | B2 |   | 4/2013  | King et al. |
| 9,461,554 | B2 | * | 10/2016 | Fu ....................... H02M 3/1582 |
| 9,673,719 | B2 | * | 6/2017  | Poshtkouhi ....... H02M 3/33584 |
| 10,340,810 | B2 |  | 7/2019  | Achtzehn et al. |
| 2007/0158118 | A1 | | 7/2007  | King |
| 2010/0244775 | A1 | * | 9/2010 | Smith ................... H02M 7/797 320/140 |
| 2011/0260539 | A1 | * | 10/2011| Wai ........................ H02J 9/061 307/66 |
| 2015/0021998 | A1 | | 1/2015  | Trescases et al. |
| 2016/0181944 | A1 | * | 6/2016 | James ...................... H02J 3/14 363/17 |

FOREIGN PATENT DOCUMENTS

DE           10235431 A1    2/2004

OTHER PUBLICATIONS

R. Shuttleworth et al., "Bidirectional Control of a Dual Active Bridge DC-DC Converter for Aerospace Applications", IET Power Electronics, vol. 5, No. 7, Aug. 1, 2012, pp. 1104-1118.
Extended European Search Report dated Mar. 19, 2021, issued during the prosecution of European Patent Application No. EP 20205710.5.

* cited by examiner

Primary Examiner — Gary A Nash
(74) Attorney, Agent, or Firm — Locke Lord LLP; Joshua L. Jones; Scott D. Wofsy

(57) ABSTRACT

A system includes a DC-DC power converter including a first pair of input/output lines for connecting to a first device for supplying power to or drawing power from the first device, and a second pair of input output lines for supplying power to or drawing from a second device. The system includes at least one ultra-capacitor connected across the first pair of input/output lines.

13 Claims, 1 Drawing Sheet

DC-DC CONVERTERS

BACKGROUND

1. Field

The present disclosure relates to power converters, and more particularly to DC-DC power converters.

2. Description of Related Art

For high voltage direct current (HVDC) to 28V DC power converters, such as dual active bridge converters, the 28V DC link capacitors have a ripple current that can be as high as the load current itself. For a given throughput power P, load current is inversely proportional to voltage. So load current at 540V DC end is P/540V. Load current at 28V end is P/28V. Ripple current is proportional to load. Ripple current handling of the capacitor is more pronounced at low voltage end of the power converter. For example, if the load current is 300 A at 28V, the capacitor ripple current is also 300 A.

Traditionally, both high and low voltages can be serviced, as long as the capacitors are sized for the highest voltages serviced. When lower voltages are serviced, the capacitors are oversized, which in aerospace applications means the capacitors are unnecessarily heavy.

The conventional techniques have been considered satisfactory for their intended purpose. However, there is an ever present need for improved systems and methods for power converters. This disclosure provides a solution for this need.

SUMMARY

A system includes a DC-DC power converter including a first pair of input/output lines for connecting to a first device for supplying power to or drawing power from the first device, and a second pair of input output lines for supplying power to or drawing from a second device. The system includes at least one ultra-capacitor connected across the first pair of input/output lines.

The first pair of input/output lines can be on a low voltage side of the DC-DC power converter, wherein the second pair of input/output lines is on a high voltage side of the DC-DC power converter. The at least one ultra-capacitor can include a plurality of ultra-capacitors connected in series with one another across the low voltage side of the DC-DC power converter. A high voltage side capacitor can be connected across the high voltage side. The plurality of ultra-capacitors can each have a rating so that the ratings of the ultra-capacitors add up to be rated for the low voltage side of the DC-DC power converter. The plurality of ultra-capacitors can include eleven or twelve 2.5V ultra-capacitors for DC-DC power conversion between 28V on the low voltage side and a higher voltage on the high voltage side, e.g., the high voltage side can be configured for 540V. The ripple current on the plurality of ultra-capacitors can be within the same order of magnitude (i.e. within a factor of 10) as the current load powered by the DC-DC power converter. The ripple current can be equal to the current of the load by an order of magnitude (i.e. within a factor of 10).

The low voltage side can include a set of four switching devices connected across the first pair of input/output lines for switching current direction in the first pair of input/output lines. A transformer can connect between the high voltage side and the low voltage side for stepping current down from the high voltage side to the low voltage side, wherein the set of four switching devices connect between the transformer and the first pair of input/output lines. A second set of four switching devices can connect between the second pair of input/output lines, wherein the second set of four switching devices connect between the transformer and the second pair of input/output lines. An inductor can be included in series between the first set of four switching devices and the transformer. The transformer can be configured to convert between 28V on the low voltage side and 540V on the high voltage side.

A method includes converting between a high DC voltage and a low DC voltage in a power converter with a high voltage side and low voltage side, wherein ripple current in a capacitor on the low voltage side is within an order of magnitude (i.e. within a factor of 10) of the current in a load powered by the power converter. The low voltage side can be configured for 28V. The high voltage side can be configured for 540V. The ripple current can be equal to than current in the load.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein.

DETAILED DESCRIPTION OF THE PREFERRED EMBODIMENTS

Figure 1:
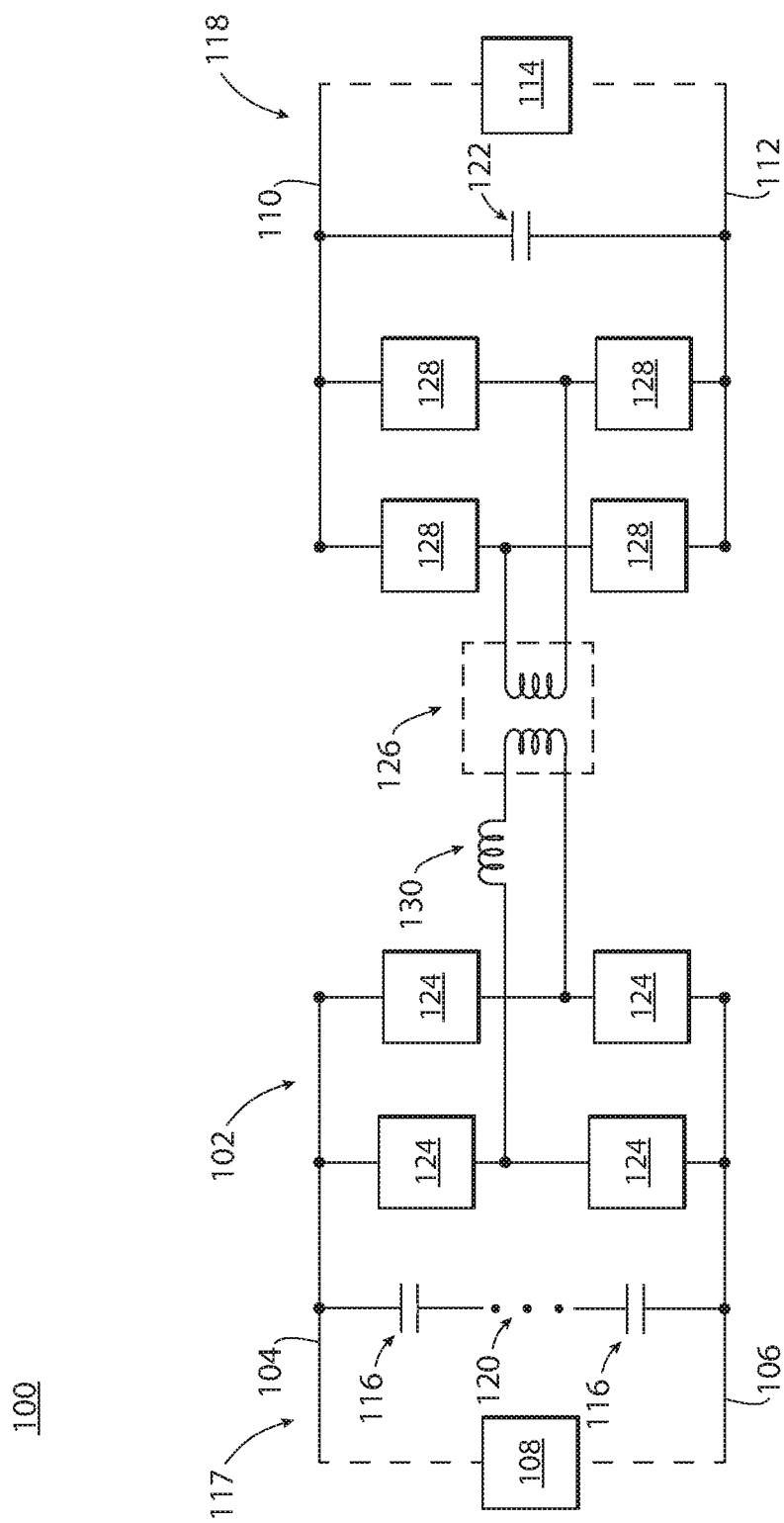
FIG. 1 is a schematic perspective view of an embodiment of a system constructed in accordance with the present disclosure, showing the ultra-capacitors on a low voltage side of a power converter.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used for DC-DC power conversion with improved ripple current handling at lower voltages compared to traditional power converter.

The system 100 includes a DC-DC power converter 102 including a first pair of input/output lines 104, 106 for connecting to a first device 108 for supplying power to or drawing power from the first device 108. A second pair of input output lines 110, 112 is included for supplying power to or drawing from a second device 114. The system 100 includes at least one ultra-capacitor 116 is connected across the first pair of input/output lines 104, 106.

The first pair of input/output lines 104, 106 is on a low voltage side 117 of the DC-DC power converter 102. The second pair of input/output lines 110, 112 is on a high voltage side 118 of the DC-DC power converter 102. The ellipses 120 in FIG. 1 indicate that any suitable number of ultra-capacitors 116 can be included as needed for a given application. The ultra-capacitors 116 are connected in series with one another across the low voltage side of the DC-DC power converter, i.e. across the first pair of input/output lines 104, 106. A high voltage side capacitor 122 can be connected across the high voltage side 118, i.e. across the second pair of input/output lines 110, 112. Each ultra-capacitor 116 can have a rating so that the ratings of the ultra-capacitors 116 add up to be rated for the low voltage side 117 of the DC-DC power converter 102. The plurality of ultra-capacitors 116 can include eleven or twelve 2.5V ultra-capacitors 116 for DC-DC power conversion between 28V on the low voltage side 117 and a higher voltage on the high voltage side 118, e.g., the high voltage side 118 can be configured for 540V. The ripple current on each of the ultra-capacitors 116 can be within an order of magnitude (i.e. within a factor of 10) of the current of a load, e.g. device 108 if device 108 is drawing power from the DC-DC power converter 102. The ripple current can be equal to the current of the load, e.g. device 108.

The low voltage side 117 includes a set of four switching devices 124 (e.g. MOSFETs or any other suitable type of switching device) connected across the first pair of input/output lines 104, 106 for switching current direction in the first pair of input/output lines 104, 106. A transformer 126 connects between the high voltage side 118 and the low voltage side 117 for stepping current down from the high voltage side 118 to the low voltage side 117. The set of four switching devices 124 connect between the transformer 126 and the first pair of input/output lines 104, 106. A second set of four switching devices 128 connects between the second pair of input/output lines 110, 112. The second set of four switching devices 128 connect between the transformer 126 and the second pair of input/output lines 110, 112. An inductor 130 is included in series between the first set of four switching devices 124 and the transformer 126. While not shown for sake of clarity, a controller can be connected to all of the switching devices 124, 128, to control the switching devices 124, 128, which are in a Dual Active Bridge architecture, for the DC-DC power conversion between the high voltage side 118 and the low voltage side 117. The controller can control the switching devices so that power flow from the high voltage side 118 to the low voltage side 117, or vice versa, as needed. For example, device 108 can be a battery on board an aircraft, and device 114 can be a motor/generator unit onboard the aircraft. In one mode, the system 100 can charge the batter (e.g. device 108) using power from the motor/generator (e.g. device 114) functioning as a generator, and in another mode, the battery can supply power to drive the generator/motor functioning as a motor. The transformer 126 can be configured to convert between 28V on the low voltage side and 540V on the high voltage side for aviation applications, for example.

A method includes converting between a high DC voltage (e.g. 540V or any other suitable voltage) and a low DC voltage (e.g. 28V or any other suitable voltage) in a power converter (e.g. DC-DC power converter 102) with a high voltage side 118 and low voltage side 117, wherein the ripple current in the low voltage side and load current are within a single order of magnitude (i.e. within a factor of 10) of each other. The ripple current in a capacitor on the low voltage side is equal to current in a load powered by the power converter. For example, in the 28V low voltage side, 540V high voltage side configuration above, the load current can be 300 A, and the ripple current in the low voltage side can also be about 300 A.

Systems and methods as disclosed herein provide for ripple current handling on the low voltage side of a DC-DC power converter, including applications where there is a large difference in voltage between the low and high voltage sides, e.g., where the high voltage is around 540V and the low voltage is around 28V. Capacitor weight is proportional to $CV^2$, where V is rated voltage. If working voltage Vw is far lower than V, then there is dead weight due to a capacitor's working voltage limitation. In fact, in traditional capacitors V>>Vw. However, in ultra-capacitors, Vw can be very close to V due to the availability of low voltage parts. The use of ultra-capacitors, unlike film capacitors used in traditional configurations, allows for the capacitors to be more fully utilized and thus right sized, e.g. for aerospace application where the excess weight of film capacitors traditionally (which are over rated for the 28V typically used in aircraft) is relieved by using ultra-capacitors.

The methods and systems of the present disclosure, as described above and shown in the drawings, provide for DC-DC power conversion with improved ripple current handling at lower voltages compared to traditional power converter, and for weight savings relative to traditional power converters. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
  a DC-DC power converter including a first pair of input/output lines for connecting to a first device for supplying power to or drawing power from the first device, and a second pair of input output lines for supplying power to or drawing from a second device; and
  at least one ultra-capacitor connected across the first pair of input/output lines, wherein the first pair of input/output lines is on a low voltage side of the DC-DC power converter, wherein the second pair of input/output lines is on a high voltage side of the DC-DC power converter, and wherein the at least on ultra-capacitor includes a plurality of ultra-capacitors connected in series with one another across the low voltage side of the DC-DC power converter, wherein the plurality of ultra-capacitors includes eleven or twelve 2.5V ultra-capacitors for DC-DC power conversion between 28V on the low voltage side and a higher voltage on the high voltage side.

2. The system as recited in claim 1, further comprising a high voltage side capacitor connected across the high voltage side.

3. The system as recited in claim 1, wherein the plurality of ultra-capacitors each have a rating so that the ratings of the ultra-capacitors add up to be rated for the low voltage side of the DC-DC power converter.

4. The system as recited in claim 1, wherein the high voltage side is configured for 540V.

5. The system as recited in claim 1, wherein the ripple current on each of the plurality of ultra-capacitors is within an order of magnitude (within a factor of 10) of the current of a load powered by the DC-DC power converter.

6. The system as recited in claim 5, wherein the ripple current and load current are equal to each other.

7. The system as recited in claim 1, wherein the low voltage side includes a set of four switching devices connected across the first pair of input/output lines for switching current direction in the first pair of input/output lines.

8. The system as recited in claim 7, further comprising a transformer connecting between the high voltage side and the low voltage side for stepping current down from the high voltage side to the low voltage side, wherein the set of four switching devices connect between the transformer and the first pair of input/output lines.

9. The system as recited in claim 8, wherein the four switching devices are a first set of four switching devices and further comprising a second set of four switching devices connecting between the second pair of input/output lines, wherein the second set of four switching devices connect between the transformer and the second pair of input/output lines.

10. The system as recited in claim 9, wherein an inductor is included in series between the first set of four switching devices and the transformer.

11. The system as recited in claim 9, wherein the transformer is configured to convert between 28V on the low voltage side and 540V on the high voltage side.

12. A method comprising:
converting between a high DC voltage and a low DC voltage in a power converter with a high voltage side and low voltage side, wherein ripple current in a capacitor on the low voltage side is within an order of magnitude (within a factor of 10) of current in a load powered by the power converter, wherein the low voltage side is configured for 28V, wherein the high voltage side is configured for 540V, and wherein the ripple current and load current are equal to each other.

13. A system comprising:
a DC-DC power converter including a first pair of input/output lines for connecting to a first device for supplying power to or drawing power from the first device, and a second pair of input output lines for supplying power to or drawing from a second device; and
at least one ultra-capacitor connected across the first pair of input/output lines, wherein the first pair of input/output lines is on a low voltage side of the DC-DC power converter, wherein the second pair of input/output lines is on a high voltage side of the DC-DC power converter, wherein the at least on ultra-capacitor includes a plurality of ultra-capacitors connected in series with one another across the low voltage side of the DC-DC power converter, wherein the low voltage side includes a set of four switching devices connected across the first pair of input/output lines for switching current direction in the first pair of input/output lines, the system further comprising:
a transformer connecting between the high voltage side and the low voltage side for stepping current down from the high voltage side to the low voltage side, wherein the set of four switching devices connect between the transformer and the first pair of input/output lines, wherein the four switching devices are a first set of four switching devices and further comprising a second set of four switching devices connecting between the second pair of input/output lines, wherein the second set of four switching devices connect between the transformer and the second pair of input/output lines, wherein the transformer is configured to convert between 28V on the low voltage side and 540V on the high voltage side.

* * * * *